United States Patent

Hollowell et al.

[19]

[11] Patent Number: 5,984,229
[45] Date of Patent: Nov. 16, 1999

[54] EXTREMELY SHORT TAKEOFF AND LANDING OF AIRCRAFT USING MULTI-AXIS THRUST VECTORING

[75] Inventors: Steven J. Hollowell, Redondo Beach; Michael R. Robinson, Rancho Palos Verdes, both of Calif.

[73] Assignee: Boeing North American, Inc., Seal Beach, Calif.

[21] Appl. No.: 08/867,656

[22] Filed: Jun. 2, 1997

[51] Int. Cl.$^6$ .................................................. B64C 15/12
[52] U.S. Cl. ...................... 244/12.4; 244/12.5; 244/23 D; 244/63; 244/109
[58] Field of Search ................................ 244/12.4, 12.5, 244/23 D, 63, 109

[56] References Cited

U.S. PATENT DOCUMENTS

| | | | |
|---|---|---|---|
| Re. 35,387 | 12/1996 | Strom | 244/75 R |
| 2,761,634 | 9/1956 | Velazquez | 244/42 |
| 2,971,725 | 2/1961 | Jakimiuk | 244/63 |
| 3,089,667 | 5/1963 | Gosslau et al. | 244/12.4 |
| 3,995,794 | 12/1976 | Lanier | 244/12 A |
| 4,173,323 | 11/1979 | Thorby et al. | 244/63 |
| 4,261,533 | 4/1981 | Roberts et al. | 244/7 R |
| 4,456,203 | 6/1984 | Louthan | 244/230 |
| 4,482,109 | 11/1984 | du Pont | 244/12.5 |
| 4,506,848 | 3/1985 | Fletcher et al. | 244/12.4 |
| 4,524,929 | 6/1985 | Gebhard | 244/63 |
| 4,687,158 | 8/1987 | Kettering | 244/63 |
| 4,896,846 | 1/1990 | Strom | 244/52 |
| 5,062,588 | 11/1991 | Garland | 244/12.4 |
| 5,098,034 | 3/1992 | Lendriet | 244/39 |
| 5,351,888 | 10/1994 | Taylor et al. | 239/127.3 |

OTHER PUBLICATIONS

NASA–Technical Memorandum—108819, Sep. 1994, "Flight Investigation of the Use of a Nose Gear Jump Strut to Reduce Takeoff Ground Roll Distance of STOL Aircraft", authors J. Eppel, G. Hardy & G. Martin.
Society of Automotive Engineers, Inc. paper 872383, published 1998, "The F–15 STOL and Maneuver Technology Demonstrator (S/MTD) Program", author F. D. Roberts.

*Primary Examiner*—J. Woodrow Eldred
*Attorney, Agent, or Firm*—Lawrence N. Ginsberg

[57] ABSTRACT

A system for enabling an aircraft to accomplish extremely short takeoffs and landings, which includes an integrated flight control system; a takeoff system; a landing system and a high thrust-to-weight propulsion system. The integrated flight propulsion control system includes a multi-axis thrust vectoring system. The takeoff system is operably engageable with the multi-axis thrust vectoring system. The takeoff system includes means for rotating the aircraft nose upwardly below stall speed without substantial use of thrust vectoring from the multi-axis thrust vectoring system. The landing system is operably engageable with the multi-axis thrust vectoring system. It includes means for de-rotating the aircraft from a high angle of attack to a main gear touchdown angle of attack sufficiently low to avoid scraping the tail of the aircraft. The high thrust-to-weight propulsion system is connected to the integrated flight propulsion control system for providing sufficient lift to support the aircraft at speeds below stall speed.

16 Claims, 15 Drawing Sheets

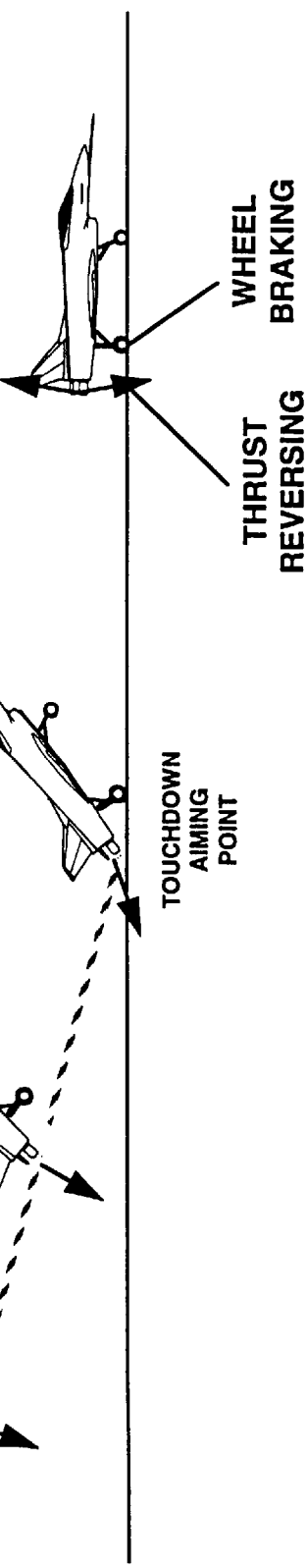

EXTREMELY SHORT TAKEOFF AND LANDING OF AIRCRAFT USING MULTI-AXIS THRUST VECTORING

BACKGROUND OF THE INVENTION

1. Field of the Invention

The present invention relates to aircraft, and more particularly to a system for enabling an aircraft to accomplish extremely short takeoffs and landings.

2. Description of the Related Art

Navy and Marine aircraft design for carrier operations have significant structural weight and cost penalties to withstand the loads associated with catapult launch and arrested landings. The speeds at which carrier aircraft land lead to high pilot workload and safety problems. Current vertical/short takeoff and landing (V/STOL) aircraft (e.g. AV-8B Harrier) have weight, cost and useful load penalties associated with the "vertical" capable engine. Current Air Force aircraft have no real capability to operate from bomb damaged runways. Civil aircraft often resort to exotic high lift systems to operate from short runways, which adds both weight and cost to such aircraft. Certain new concepts such as those applied to the Joint Strike Fighter (JSF) attempt to provide all these capabilities but at significant added weight and cost.

Initial purchase and ownership costs for both military and civil aircraft have become a deciding factor in successive new and upgraded/modified aircraft. Weight is a paramount consideration in determining cost, as well as operational capability/flexibility. A concept is required that will allow very short takeoffs and landings without the traditional weight and cost penalties.

U.S. Pat. No. 2,761,634, issued to J. L. Velazquez, discloses an aircraft that sits statically with a pronounced nose-up attitude. It also uses propellers (and depends on slipstream effects of these propellers) and a very large flap on the wing to prevent stalling.

U.S. Pat. No. 2,971,725, issued to V. J. Jakimiuk, discloses the use of multiple jet engines, two of which rotate to provide thrust vectoring.

U.S. Pat. No. 3,995,794, issued to E. M. Lanier, discloses an aircraft provided with two wings and a top wing having engines attached thereto. The wing and engines are capable of rotating to provide a thrust vectoring effect.

U.S. Pat. No. 5,098,034, issued to W. C. Lendriet, discloses an aircraft having rotating wings with a very complicated flap system and propellers (taking advantage of propeller slipstream effects) in front of the wing blowing over it to prevent stall.

U.S. Pat. No. 4,687,158, issued to C. W. Kettering, discloses a jump strut landing gear apparatus for providing an aircraft with a short takeoff and landing capability. The apparatus utilizes incrementally fired, pyrotechnic charges to explosively generate the required compressed fluid to drive the apparatus.

U.S. Pat. No. 5,351,888 issued to J. D. Taylor, discloses a multi-axis vectorable exhaust nozzle. A convergent-divergent exhaust nozzle is mounted to an exhaust duct of a jet aircraft engine by a circumferentially-spaced set of hydraulic cylinders. The cylinders are interconnected in captured flow via hydraulic circuits, which allow the cylinders to function as a gimbal mounting.

U.S. Pat. No. 4,261,533, issued to Lawrence T. Roberts et al., disclose a technique for control of an aircraft in ultra-deep stall. Tilting the stabilizer at an extreme angle to the fuselage, with leading edge down, and controlling an varying engine thrust comprise a method for all-axis control of a generally conventional aircraft in ultra-deep stall.

U.S. Pat. No. 4,896,846, and its Pat. No. Re. 35,387, both issued to T. H. Strom, disclose a technique to perform a post-stall maneuver for aircraft combat. The aircraft utilizes a highly deflective canard and engine thrust vectoring.

None of the aforementioned patents provide a means of using conventionally mounted jet engines with thrust vectoring, fixed wings, and simple flap systems to affect short takeoffs and landings.

OBJECTS AND SUMMARY OF THE INVENTION

It is, therefore, a principal object of the present invention to provide an aircraft with the capability of having extremely short takeoffs and landings without the design penalties commonly associated with V/STOL aircraft.

It is another object to provide a fixed wing jet propelled aircraft capable of post-stall takeoff and approach speeds.

It is still another object to provide methods for accomplishing the aforementioned extremely short takeoffs and landings.

These and other objects are accomplished by the present invention, which comprises an integrated flight propulsion control system; a takeoff system; a landing system and a high thrust-to-weight propulsion system. The integrated flight propulsion control system includes a multi-axis thrust vectoring system. The takeoff system is operably engageable with the multi-axis thrust vectoring system. The takeoff system includes means for rotating the aircraft nose upwardly below stall speed without substantial use of thrust vectoring from the multi-axis thrust vectoring system. The landing system is operably engageable with the multi-axis thrust vectoring system. It includes means for de-rotating the aircraft from a high angle of attack to a main gear touchdown angle of attack sufficiently low to avoid scraping the tail of the aircraft. The high thrust-to-weight propulsion system is connected to the integrated flight propulsion control system for providing sufficient lift to support the aircraft at speeds below stall speed.

The present invention provides the capability for an aircraft to accomplish extremely short takeoffs and landings. As used herein, the term "extremely" short takeoffs and landings refers to takeoff and landing distances in a range of from about 300–800 feet. (This is accomplished by reducing the takeoff and landing speeds to between about 60 to 100 knots.)

As will be disclosed in detail below, the present invention relates to the application of an aircraft having an integrated flight propulsion system and capable of post-stall flight operations to enable takeoffs and landings at speeds below the aerodynamic stall speed of the aircraft. An aircraft flown in this manner is capable of extremely short takeoff and landing distances.

As compared to conventional aircraft, the present invention allows lower approach speeds, which are safer (i.e. fewer accidents). The present invention allows use of shorter runways. For military aircraft this means that previously unsuitable forward bases are now accessible. For commercial aircraft this means that operations out of short runways in downtown areas are now possible.

As compared to current Navy aircraft, capable of takeoff and landing from an aircraft carrier, the lower approach speeds possible with the present invention make arrested landings easier for the pilot to perform. The lower approach speeds result in a less loads on the landing gear at touchdown. This allows the landing gear, and the entire aircraft to be made lighter. To takeoff from an aircraft carrier, current Navy aircraft require a catapult. To land on an aircraft carrier, current Navy aircraft require an arresting gear. The short takeoff and landing distances of an aircraft with the present invention make it possible to takeoff and land from amphibious ships that do not have catapult and arresting gear.

As compared to current V/STOL jet powered aircraft (e.g. AV-8B), the present system has the advantage of not requiring a specialized fore and aft thrust vectoring engine, or dedicated lift engines/fans. This makes the aircraft lighter and less complicated. It also makes supersonic flight much easier to accomplish.

The new generation of military fighter and attack aircraft will be equipped with thrust vectoring nozzles (e.g. F-22). For an aircraft thus equipped, there is little or no weight penalty associated with adding the capabilities embodied in the present invention. This allows an aircraft to enjoy the advantages of low takeoff and landing speeds and distances, without the weight/cost/complexity penalties of V/STOL aircraft.

Other objects, advantages and novel features of the present invention will become apparent from the following detailed description of the invention when considered in conjunction with the accompanying drawings.

BRIEF DESCRIPTION OF THE DRAWINGS

FIG. 20 shows the landing sequence of events for the aircraft shown in FIG. 17.

The same elements or parts throughout the figures are designated by the same reference characters.

DETAILED DESCRIPTION OF THE PREFERRED EMBODIMENT

Figure 1:
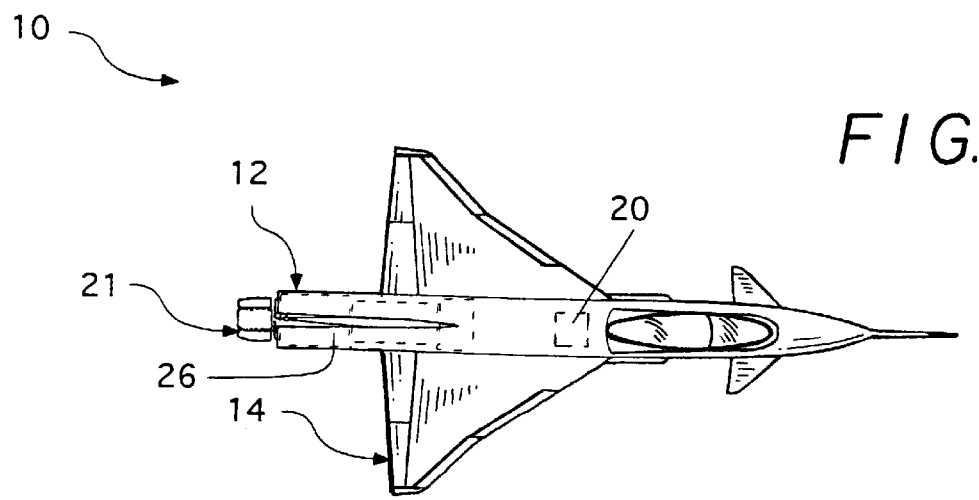
FIG. 1 is a top plan view of an aircraft of the present invention.
Figure 2:
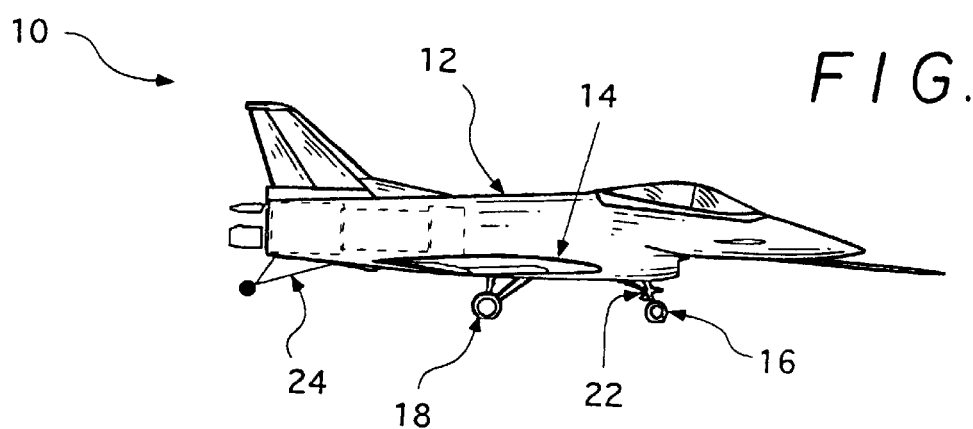
FIG. 2 is a side elevational view of the aircraft of FIG. 1.
Figure 3:
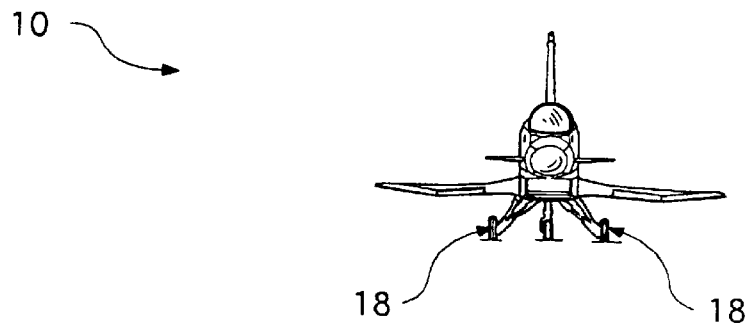
FIG. 3 is a front view of the aircraft of FIG. 1.

Referring to the drawings and the characters of reference marked thereon, FIGS. 1–3 illustrate a preferred embodiment of the aircraft of the present invention, designated generally as 10. Aircraft 10 comprises a fuselage 12 and a wing 14 mounted to the fuselage 12. A conventional fuselage 12 and wing 14 may be utilized. A tricycle landing gear, comprising a nose gear 16 and two main gear 18, is attached to the fuselage 12. The tricycle landing gear may be designed with a need to withstand only about a 10 ft. per second landing load. This provides a weight reduction over landing gear on aircraft designed to accomplish short landings on aircraft carriers, which are designed to withstand 24 ft. per second landing load.

A takeoff and landing system enables the aircraft to accomplish extremely short takeoffs and landings (ESTOLs). The takeoff and landing systems comprises an integrated flight propulsion control system (IFPCS), including a control system electronics 20 and multi-axis thrust vectoring system (nozzle) 21. The IFPCS also includes a jump strut 22 or other type of takeoff system; a tail wheel assembly or landing system 24 and a high thrust-to-weight propulsion system 26. The vectoring nozzle 21 of the integrated flight propulsion control system may be any one of several types, which provide multi-axis thrust vectoring capability. The example shown in FIGS. 1–3 is a paddle-type nozzle developed by Rockwell International Corporation and Messerschmitt Bolkow Blohm (MBB) for the X-31 Aircraft. An example of another type of nozzle, an AVEN nozzle, is described in U.S. Pat. No. 5,351,888, issued to Taylor et al. A third type of nozzle has been used on a F-15 SMTD, described in Society of Automotive Engineers, Inc. paper 872383, published in 1988, entitled "The F-15 STOL and Maneuver Technology Demonstrator (S/MTD) Program".

The jump strut 22 can be any of several existing designs. U.S. Pat. No. 4,687,158 discloses a possible design. NASA-Technical Memorandum -108819, September 1994, entitled "Flight Investigation of the Use of a Nose Gear Jump Strut to Reduce Takeoff Ground Roll Distance of STOL Aircraft" describes another possible design.

The high thrust-to-weight propulsion system 26 may be of a conventional type that produces a thrust component, which, when combined with the aerodynamic lift, is equal to, or greater than, the weight of the aircraft 10. To generate this thrust, the engine may or may not have an afterburner.

Although the main gear 18 has been illustrated as being attached to the fuselage 12, it is understood that it could be alternately attached to the wing.

The control feedback system electronics of the IFPCS generates the necessary signals to control the deflections of the aerodynamic surfaces (e.g. rudder, ailerons, flaperons, etc.). The unit can be any of several commercially available units, such as those currently in F-16 and F-18 aircraft. For the application, the unit is modified to include signals for thrust vectoring deflections. Further, the control law software (which translates pilot stick and rudder commands to control surface deflections) is modified to include thrust deflection and treat it exactly as any of the primary aerodynamic control surfaces. In so doing, the control laws can simultaneously generate an optimum mix of control surface and thrust deflections to maintain aircraft stability during low speed flight.

Figure 4:
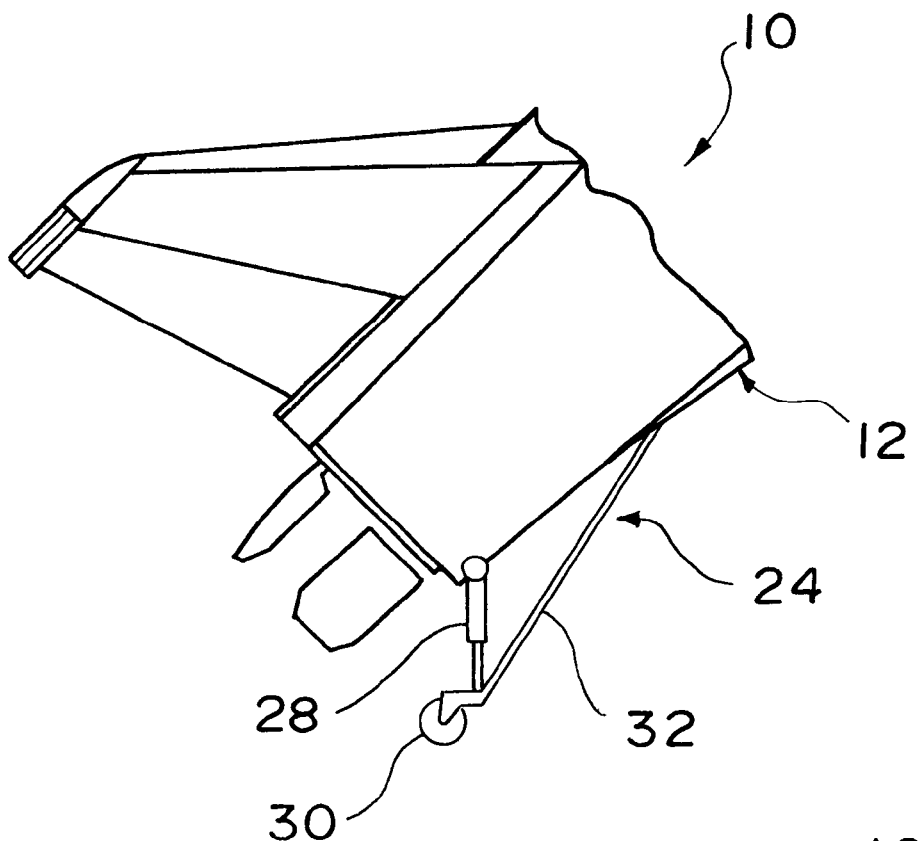
FIG. 4 is an enlarged side view of the rear portion of the FIG. 1 aircraft, illustrating the tail wheel assembly.
Figure 5:
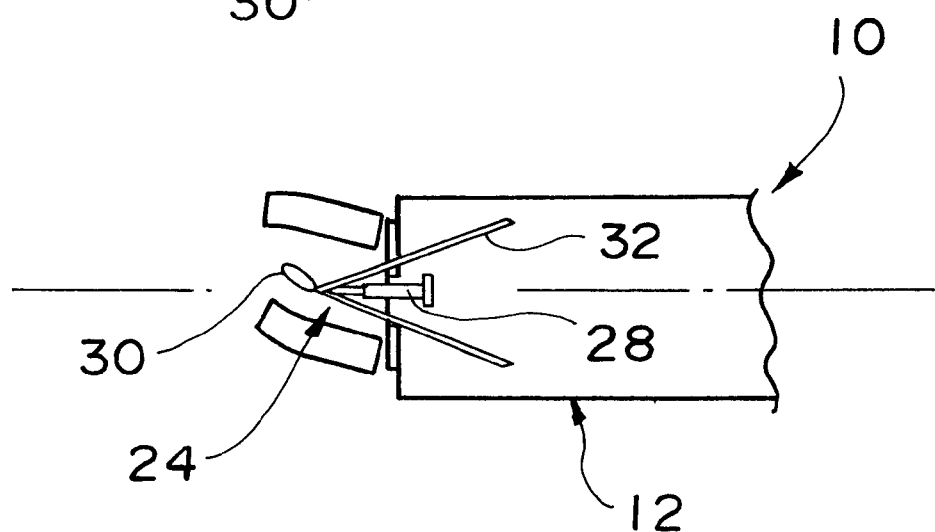
FIG. 5 is a bottom view of the rear portion of the aircraft.

Referring now to FIGS. 4–5, an enlarged view of the rear of the aircraft 10 is shown to more clearly show the tail wheel assembly 24. The tail wheel assembly 24 includes a shock absorbing strut 28, which is attached to the fuselage 12. Strut 28 can be of a passive design, or actively controlled by the integrated flight propulsion control system 20, 21 to provide a variable damping force. A castoring wheel assembly 30 enables the thrust vectoring system to provide yaw control with the tail wheel assembly in contact with the ground. A drag strut 32 connected to the fuselage 12 positions the castoring wheel assembly 30 and transfers the fore and aft loads to the fuselage 12. It could be articulated to facilitate retraction of the tail wheel assembly 30.

The aircraft 10 is capable of controlled flight at high angles of attack during takeoff and landing. It is, therefore, capable of flying at relatively low speeds. As a consequence, the takeoff and landing distances can be made very short.

Figure 6:
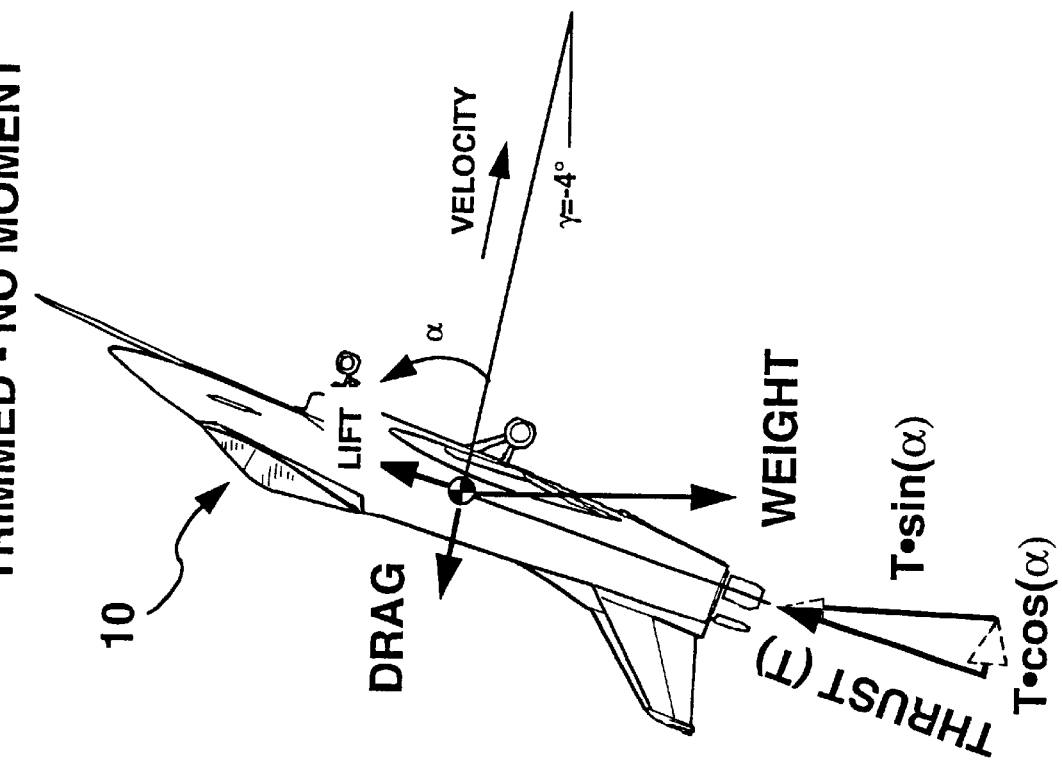
FIG. 6 is a schematic view of the aircraft in a typical post-stall approach, with nomenclature added to provide a clearer understanding of the Detailed Description.

Referring now to FIG. 6, an aircraft 10 is shown engaged in the typical post stall approach, in accordance with the principles of the present invention. The descent flight path angle γ (glide slope) is typically about −4°. The aircraft must be trimmed during post-stall approach. For a trimmed solution, the following equilibrium equations must be solved.

$$\text{Weight} = C_L qS + \text{Thrust} \times \sin(\alpha + \delta_T)$$

$$\text{Thrust} \times \cos(\alpha + \delta_T) = C_D qS$$

$$\text{Thrust} \times \sin(\delta_T) \times T_{ARM} = C_M qS\bar{c}$$

Where:

$C_L$ is the aerodynamic lift coefficient at approach α q is the dynamic pressure (0.5 ρV²)

where:

ρ is the air density

V is the approach velocity

S is the wing reference area

α is the approach angle of attack $\delta_T$ is the trust deflection angle $C_D$ is the aerodynamic drag coefficient at approach α

$T_{ARM}$ is the thrust moment arm ($X_{THRUST-XCG}$)

$C_M$ is the aerodynamic pitching moment coefficient at approach a $\bar{c}$ is the mean aerodynamic chord (MAC)

Note also that aerodynamic drag force=$C_D qS$, aerodynamic lift force=$C_L qS$ and aerodynamic moment=$C_M qS\bar{c}$. FIG. 6 depicts these forces.

Figure 7:
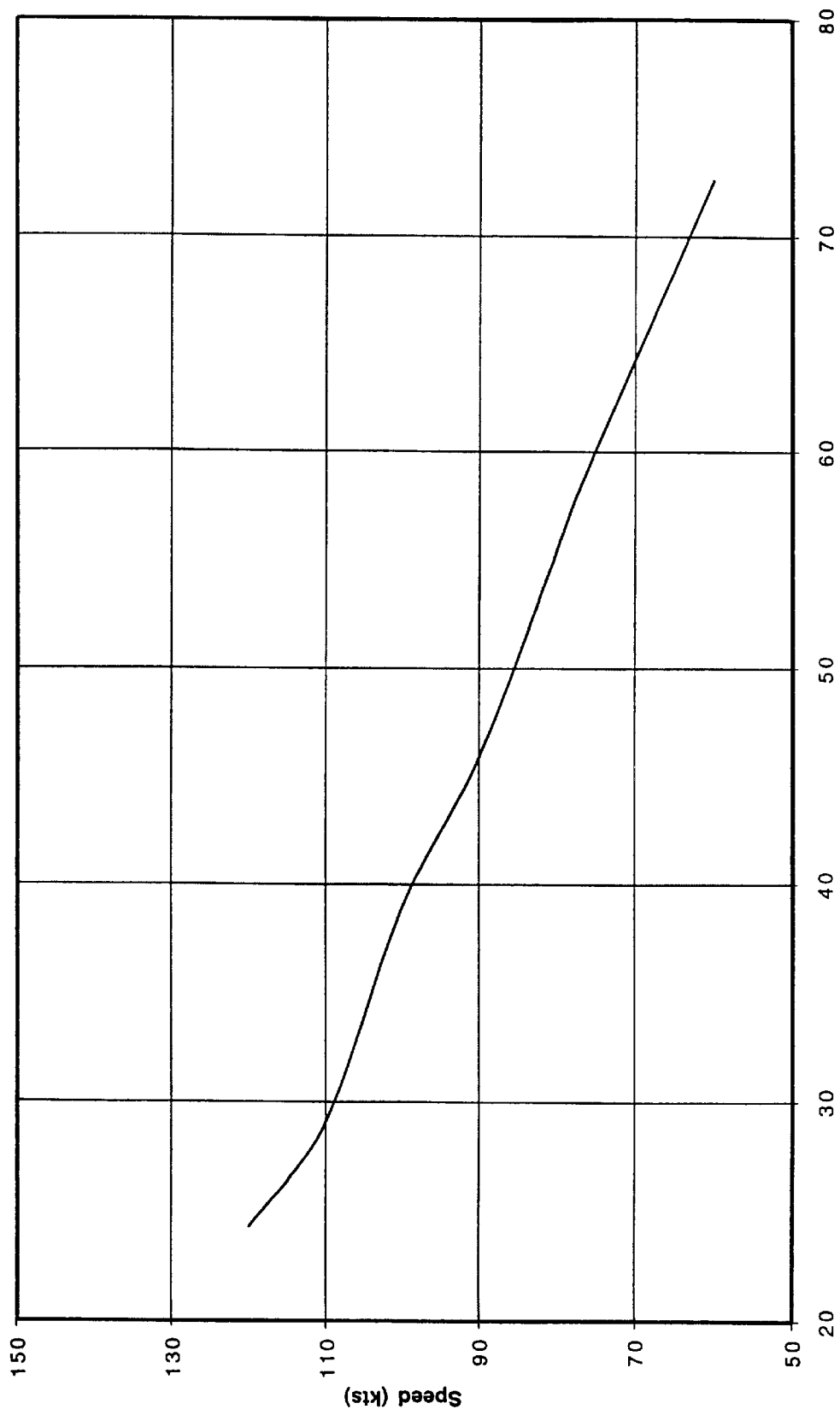
FIG. 7 is a graph of approach speed versus approach angle of attack.

Solving these equations simultaneously with values typical of a lightweight fighter aircraft yields a relationship between approach speed (velocity) and approach angle of attack, as depicted in FIG. 7. This figure shows that the approach speed is inversely proportional to the angle of attack over a wide range of angles between 30° and 70°.

The landing distance ($S_g$) of any aircraft is directly proportional to the square of the touchdown speed. This distance is independent of the aircraft size and weight. It can be determined approximately by the following relation.

$$S_g = 2V_{TD}^2 g\mu_b$$

where:

$V_{TD}$ is the touchdown velocity g is the acceleration due to gravity $\mu_b$ is the braking friction coefficient (typically 0.4)

Figure 8:
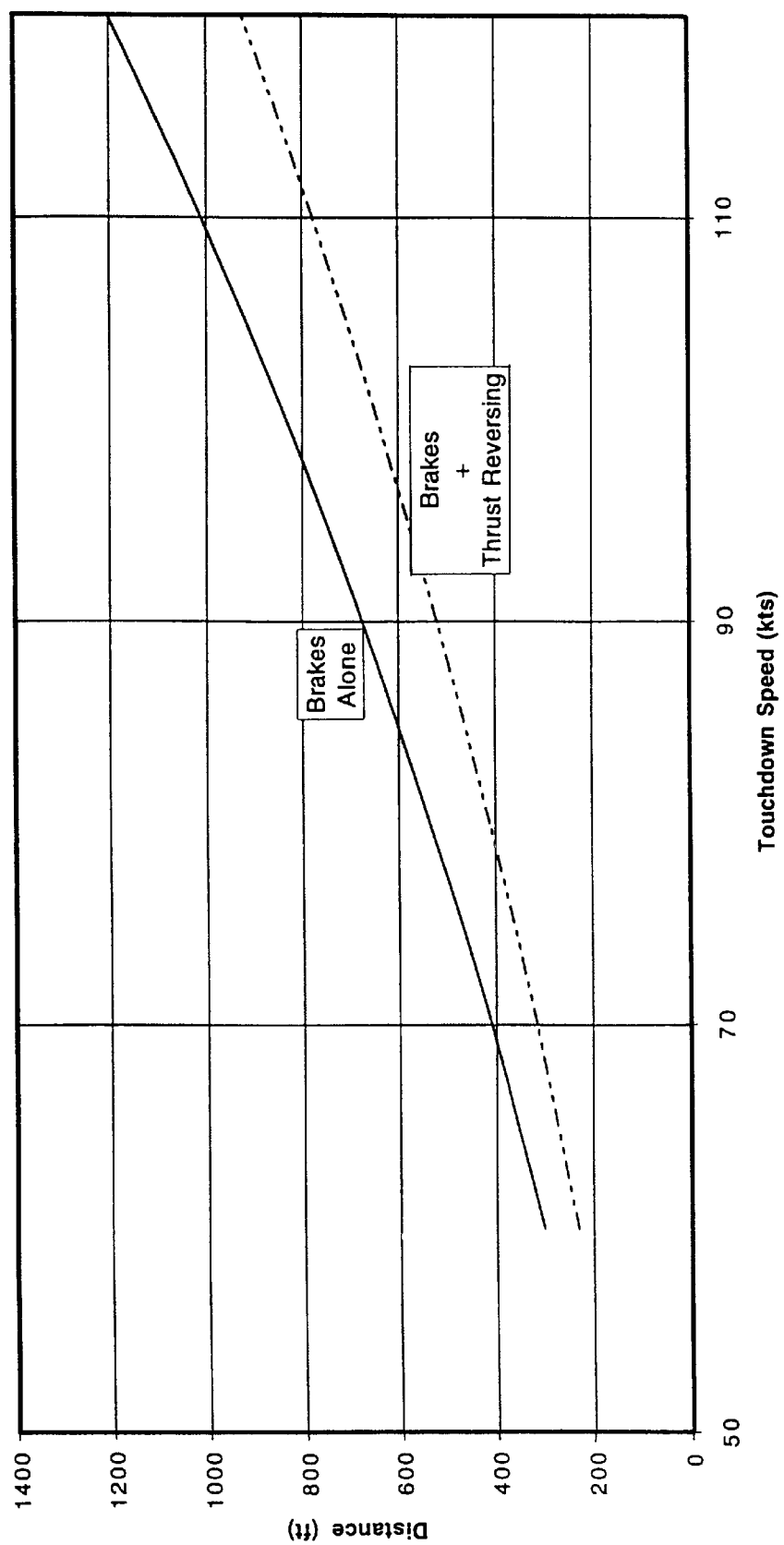
FIG. 8 is a graph of landing distance versus touchdown speed with two conditions, 1) brakes alone, and 2) brakes and thrust reversing.

The primary means of stopping an aircraft is with wheel brakes. However, thrust reversing can substantially reduce the stopping distance. Using weight and braking coefficient values typical of a lightweight fighter, the relationship between speed and landing distance is depicted in FIG. 8. This figure also shows the contribution of a nominal amount of thrust reversing.

A conventional aircraft will approach at approximately 15° angle of attack, which results in a touchdown speed of 120 kts and a landing distance of 1200 ft. An aircraft utilizing the principles of the present invention will approach with a high angle of attack of between about 40° and 70°. This results in touchdown speeds between about 100 kts and 60 kts. These low approach speeds yield landing distances between about 835 ft and 300 ft, which is up to a 75% improvement over conventional aircraft.

During the low speed, high angle of attack approach the IFPCS must control the aircraft and provide a substantial portion of the lift needed to support the aircraft in flight.

Figure 9:
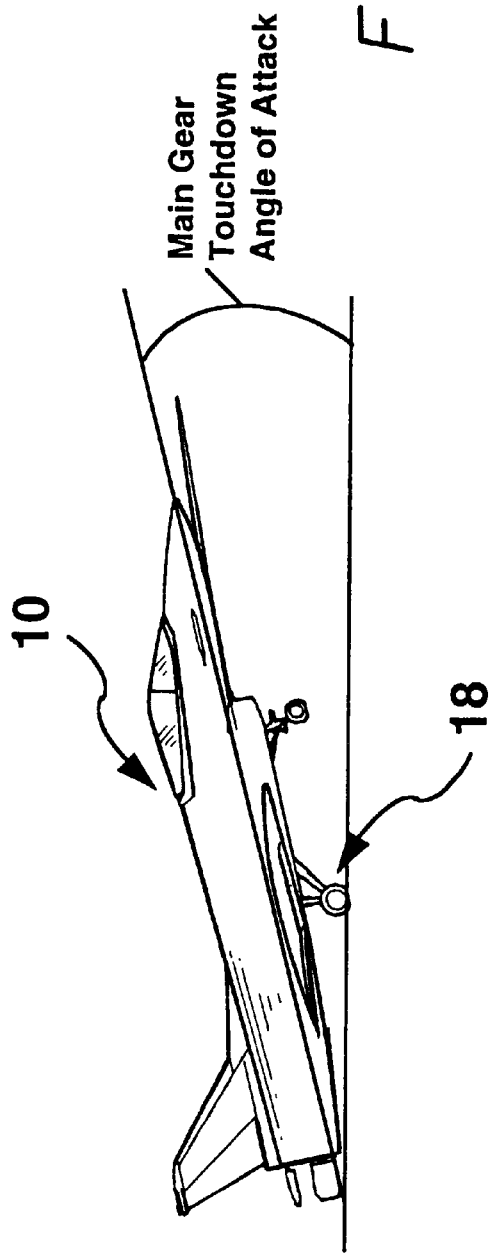
FIG. 9 is a side view of the aircraft, illustrating main gear touchdown angle of attack.
Figure 10:
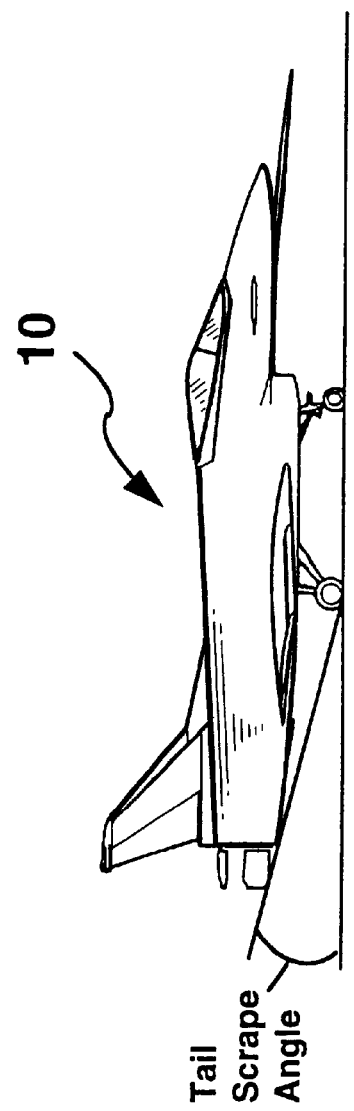
FIG. 10 is a side view of the aircraft illustrating the tail scrape angle.

Referring to FIG. 9, to successfully complete the post-stall landing, the aircraft must de-rotate from a high angle of attack to a main gear touchdown angle of attack sufficiently low to avoid scraping the tail of the aircraft 10. The main gear touchdown angle of attack (which is the same in magnitude as the tail scrape angle, see FIG. 10) may be typically between about 10° to 30°. (As will be discussed below with respect to another preferred embodiment, the touchdown angle of attack may be made substantially higher). Such a de-rotation may be accomplished by use of the tail wheel assembly 24 with the castoring wheel assembly 30.

During de-rotation, yaw control of the aircraft is maintained using the thrust vectoring capability of the IFPCS. For yaw control the thrust vectoring must generate a side-to-side movement of the aircraft tail. During de-rotation, the tail wheel is in contact with the ground. Here, a conventional fixed tail wheel would prevent side-to-side movement of the aircraft tail, while the castoring wheel assembly 30 allows this side-to-side movement. The shock absorbing strut 28 of the tail wheel assembly 24 can be of either conventional passive viscous damping construction, or variable damping which is actively controlled by the IFPCS to prevent tail strike, while minimizing the nose down pitch rotation.

An alternate method for de-rotating the aircraft might comprise a thruster system mounted in proximity to the aircraft nose for providing a jet efflux in the downward direction so as to generate lift and control the rate of de-rotation.

Figure 11:
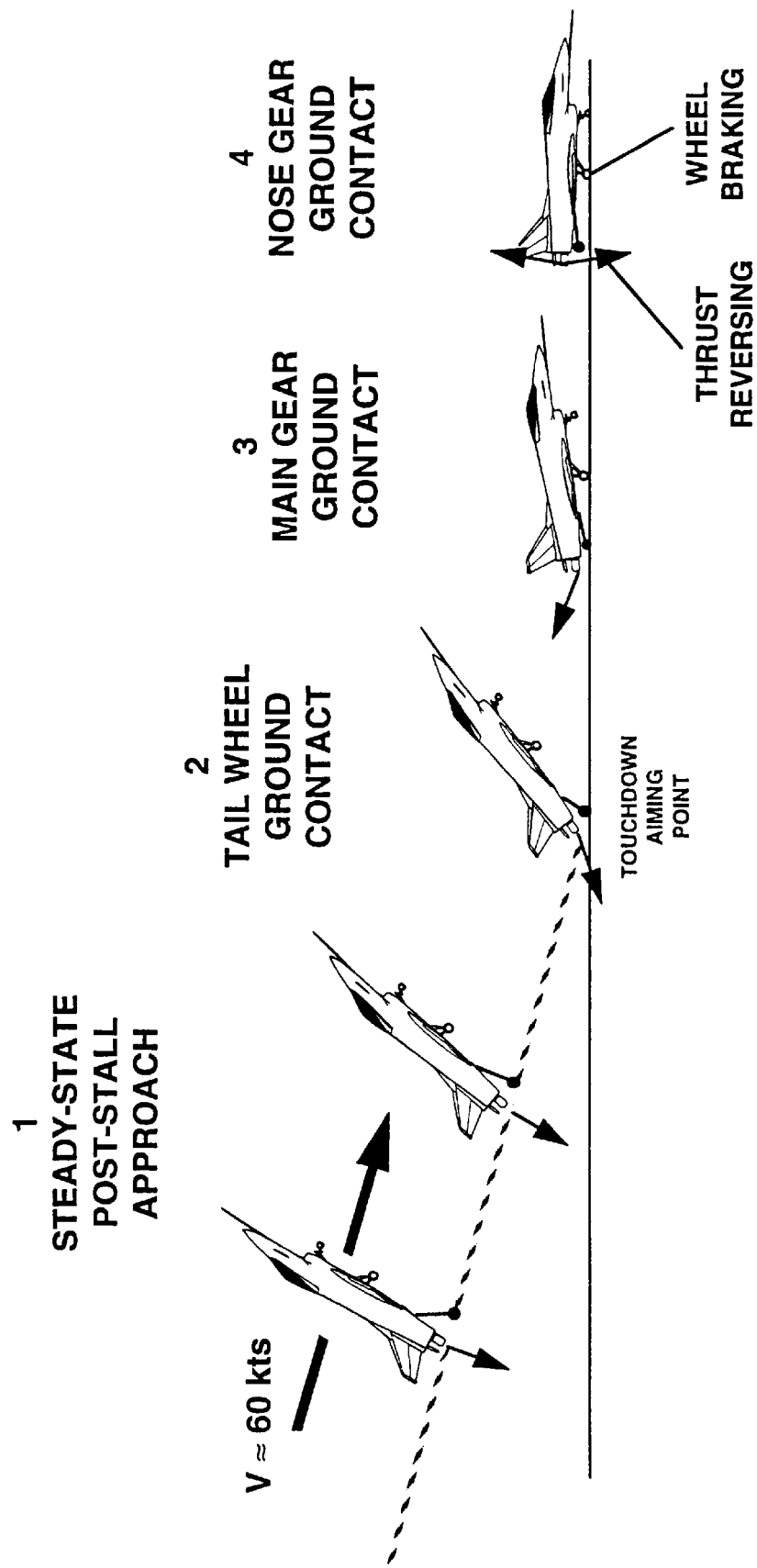
FIG. 11 is a schematic illustration of the landing sequence of events.

Referring now to FIG. 11, the landing sequence of events is summarized:

In step 1 the landing gear is extended and the aircraft is pitched up to a high angle of attack, steady-state post stall approach using the IFPCS. The aircraft is stabilized on a glide slope of about −4° at a speed between about 60 and 100 kts, so as to provide a rate of descent of 10 ft. per second or less. At this speed, the aerodynamic control surfaces are ineffective, so stability is maintained with the thrust vectoring system. At the approach pitch attitude, the thrust pitch angle will be very nearly zero, hence no pitching moment will be generated.

In step 2, the aircraft contacts the ground with the tail wheel and the nose begins to rotate down. The thrust is vectored from side-to-side (yaw) as needed to maintain the aircraft in a straight line down the runway.

In step 3 the aircraft has rotated down until the main landing gear has contacted the ground. At this point, the thrust is vectored up to slow the rotation of the aircraft. Side-to-side vectoring is continued as necessary to control the aircraft.

In step 4 the aircraft has rotated down until the nose landing gear has contacted the ground. The anti-lock brakes on the main landing gear are automatically actuated through a switch that senses nose gear ground contact. If a thrust reversing system is employed (not essential for the present invention) it is actuated at this time. Aircraft steering is accomplished using the nose landing gear.

The most powerful means to achieve a short takeoff distance is to reduce the takeoff speed of the aircraft. One way to reduce the takeoff speed is to increase the angle of attack that the aircraft can generate during the takeoff run. The analytical discussion that follows will show that a modest 15% increase in the takeoff angle of attack can reduce the takeoff distance by 50%. Utilization of the principles discussed hereinafter can increase the takeoff angle of attack by up to 50%.

Historically, with conventional aircraft, the takeoff angle of attack has been limited by either the tail scrape angle or stall speed. The ski-jump takeoff technique developed by the United Kingdom Royal Navy provides a means for an aircraft to rotate to a higher angle of attack than the tail scrape angle. This technique is described in a special report entitled "The Jet V/STOL HARRIER" by John W. Fozard, published by British Aerospace Aircraft Group, July, 1978; pages 122–159. Conventional aircraft using this technique are still limited to speeds above stall because the aerodynamic control surfaces are needed to maintain aircraft stability. By incorporating an IFPCS 20 and a high thrust-to-weight engine 26, it is possible to takeoff below stall speed, maintain aircraft stability with the IFPCS and generate sufficient lift with the engine thrust.

A simplified expression for the ground roll distance is $$S_g = V_{TO}^2/2a$$

where:

$S_g$=takeoff ground roll
$V_{TO}$=takeoff velocity
a=acceleration at $0.7V_{TO}$=g·(Thrust−Drag−$\mu_r$N)/Weight
The above expression can be re-stated as follows:

$$S_g = \frac{V_{TO}^2}{2g\left(\frac{T}{W} - \frac{D}{W} - \mu_r\right)}$$

At liftoff, drag is typically much lower than thrust and the normal force (N) is equal to the weight, while the rolling friction coefficient ($\mu_r$) is typically 0.3. So the expression can be reduced to its dominate terms:

$$S_g = \frac{V_{TO}^2}{2g(T/W)}$$

Figure 12:
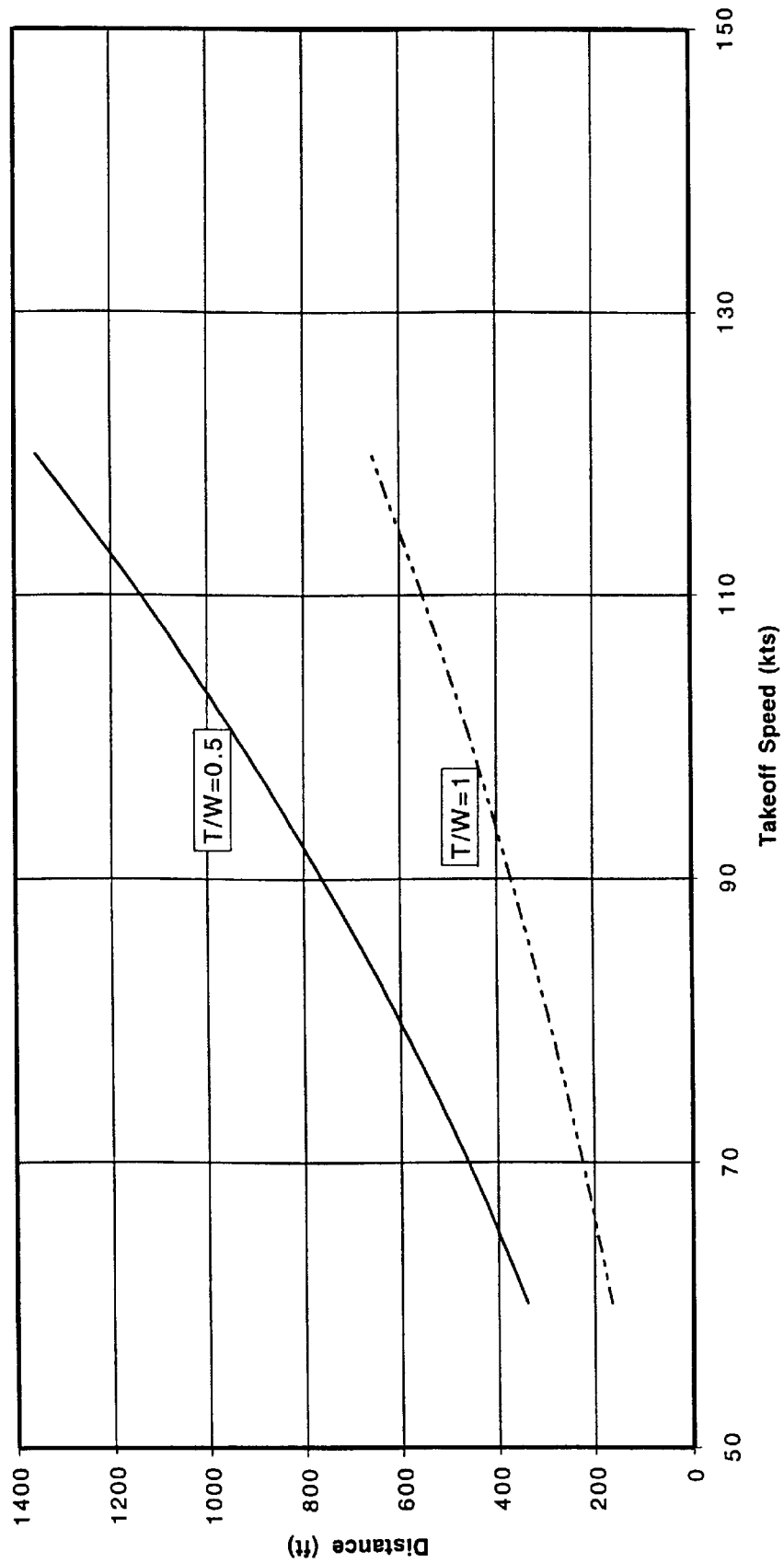
FIG. 12 is a graph of takeoff distance versus takeoff speed showing a range of thrust-to-weight between 0.5 and 1.0.

Using drag, thrust, and weight values of a typical lightweight fighter, the relationship between speed, thrust to weight ratio (T/W) and takeoff distance is depicted in FIG. 12.

The takeoff distance goes up by the square of the velocity, so the aircraft needs to takeoff at the lowest possible speed. The aircraft will takeoff when the following condition is met:

$$C_L qS + \text{Thrust} \times \sin(\alpha + \delta_T) > \text{Weight}$$

Further, the aircraft needs to be trimmed and accelerating, requiring the following two conditions to be met:

$$\text{Thrust} \times \cos(\alpha + \delta^T) > C_D qS$$

$$\text{Thrust} \times \sin(\delta_T) \times T_{ARM} = C_M qS\bar{c}$$

Where:
$C_L$ is the aerodynamic lift coefficient at takeoff $\alpha$
q is the dynamic pressure (0.5 $\rho V^2$)
where:
  $\rho$ is the air density
  V is the takeoff velocity
S is the wing reference area
$\alpha$ is the takeoff angle of attack
$\delta_T$ is the trust deflection angle
$C_D$ is the aerodynamic drag coefficient at takeoff a
$T_{ARM}$ is the thrust moment arm ($X_{THRUST} - X_{CG}$)
$C_M$ is the aerodynamic pitching moment coefficient at takeoff a
$\bar{c}$ is the mean aerodynamic chord (MAC)

Figure 13:
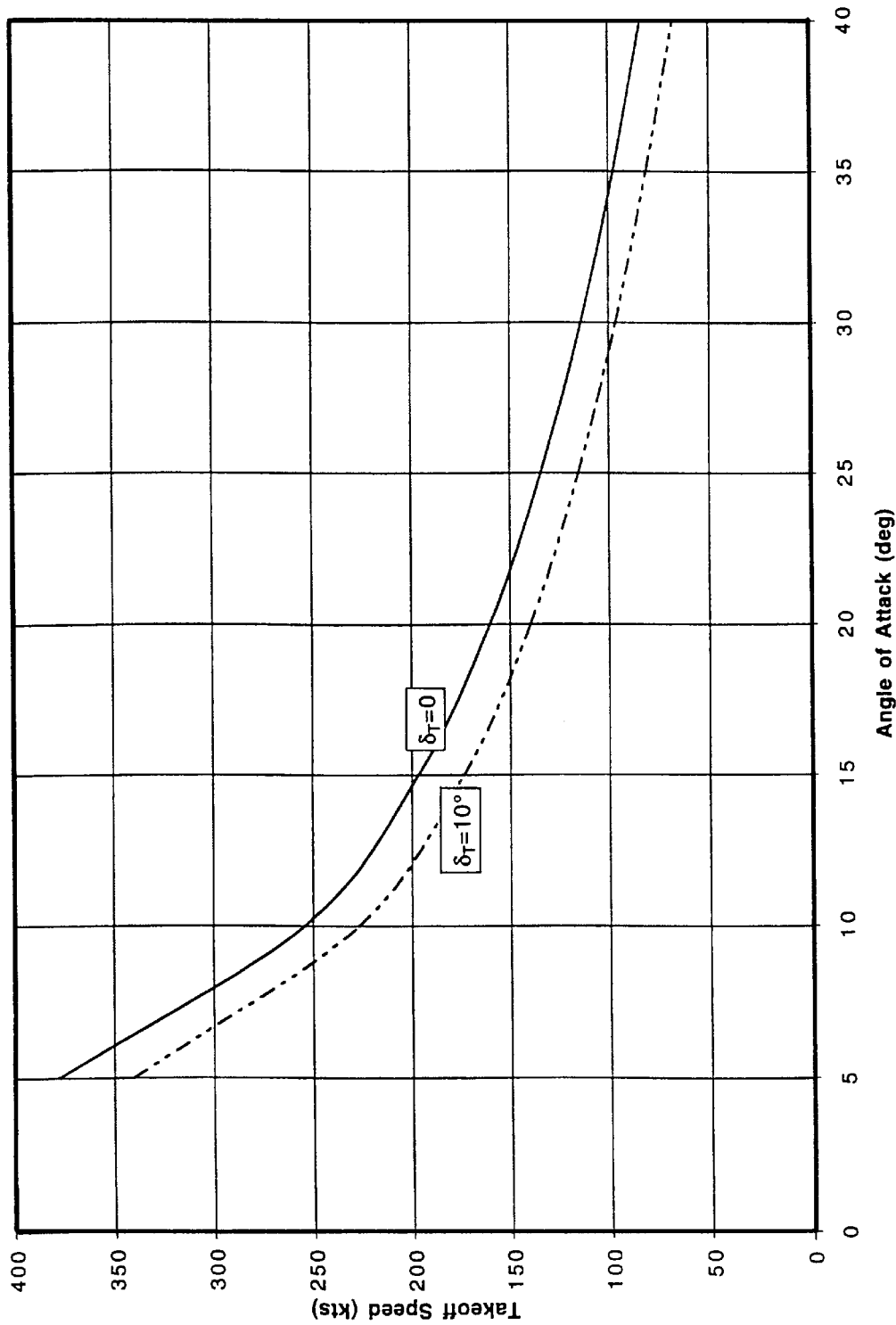
FIG. 13 is a graph of takeoff speed versus angle of attack with a range of thrust vector angles between 0 and 10°.

The relationship between takeoff speed and angle of attack for a typical lightweight fighter is depicted in FIG. 13. This shows that takeoff velocity varies approximately with the square of the angle of attack capability of the aircraft. FIG. 13 has curves for a thrust deflection of zero and ten degrees down, indicating the benefit of being able to deflect the thrust during takeoff. The maximum allowable thrust deflection is limited by the need to trim the aircraft so that the pitching moment is zero. So the combined trends from FIGS. 12 and 13 indicate that takeoff distance varies with the fourth power of angle of attack capability.

Although FIGS. 1–3 show use of a jump strut 22, a ski jump ramp may be used in lieu thereof, or possibly in combination therewith. The ski jump ramp works by rotating the velocity vector of the aircraft up and using the aircraft's momentum (rather than aerodynamic force) to lift it off the ground. This principal is exactly the same a human skier going over a bump in the snow and flying into the air, even though he has no wings. For this application, the aircraft will continue to rotate to a high angle of attack, between about 20° and 50°. In this attitude the thrust will generate a significant portion of the needed lift force with very little thrust vectoring, so the aircraft can remain trimmed. The aircraft will be stabilized (controlled) by the IFPCS, which will initially be primarily thrust vectoring. Then as the aircraft accelerates, the aerodynamic control surfaces will seamlessly take over control.

Figure 14:
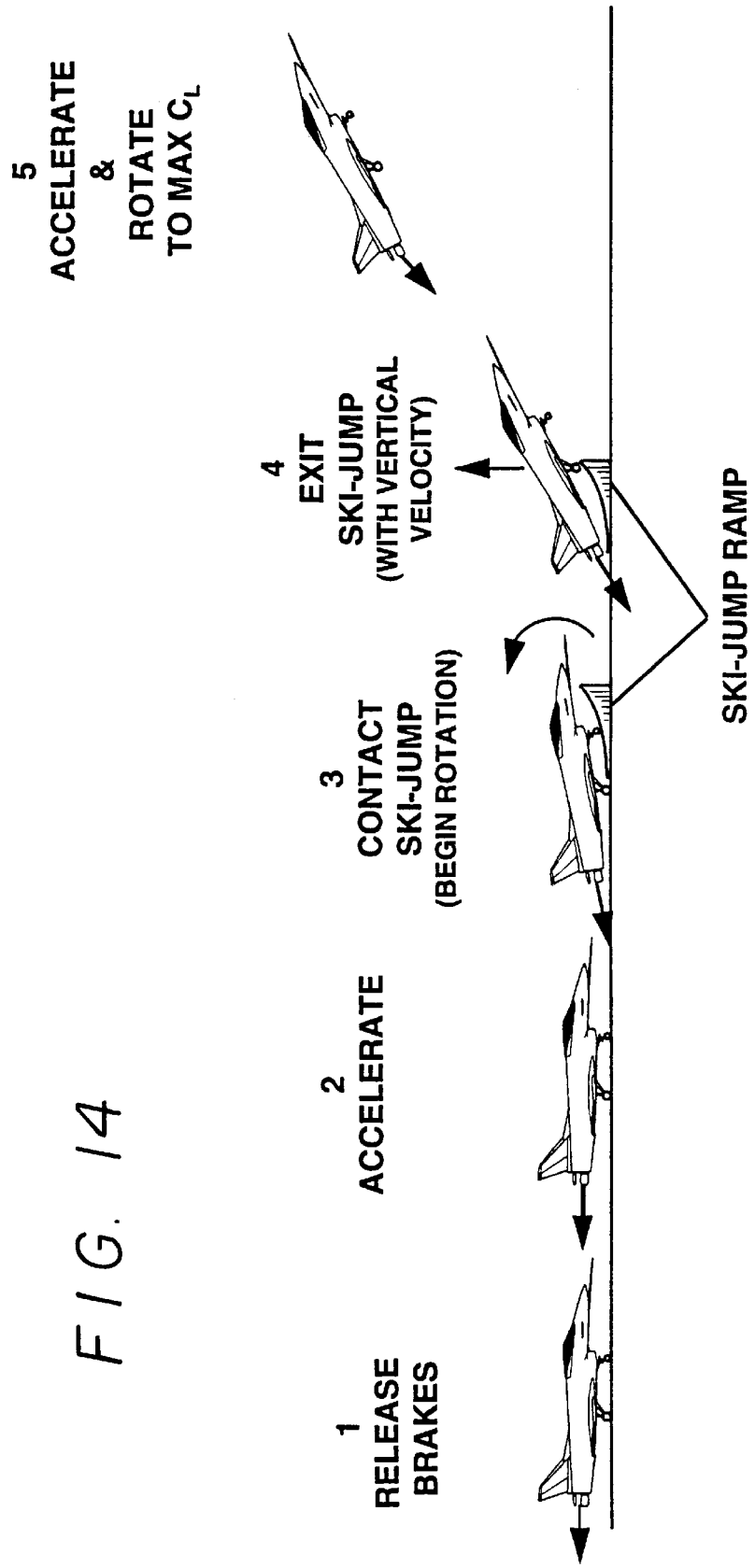
FIG. 14 illustrates a takeoff sequence of events utilizing a ski jump ramp.

Referring now to FIG. 14, the takeoff sequence of events is summarized:

In step 1 the engine is throttled up to maximum power and the brakes are released.

In step 2 the aircraft accelerates to takeoff speed. The thrust vector angle is zero for maximum acceleration.

In step 3 the nose gear contacts the ski jump ramp and the nose of the aircraft begins to rotate up. The velocity vector is still parallel to the runway.

In step 4 the main gear contacts the ski jump ramp. The nose continues to rotate up, but now the entire aircraft is lifted up, also. So the velocity vector has been rotated up. With the main gear lifted above the runway, the aircraft is free to rotate to a higher angle of attack than its normal tailscrape angle.

In step 5 the aircraft has cleared the ski jump ramp and its nose continues to rotate up to the maximum angle of attack, which is between the aircraft's normal angle of attack and 70°. The thrust is vectored down to stop the rotation and to generate additional lift. The aircraft continues to accelerate to its normal climb speed.

Figure 15:
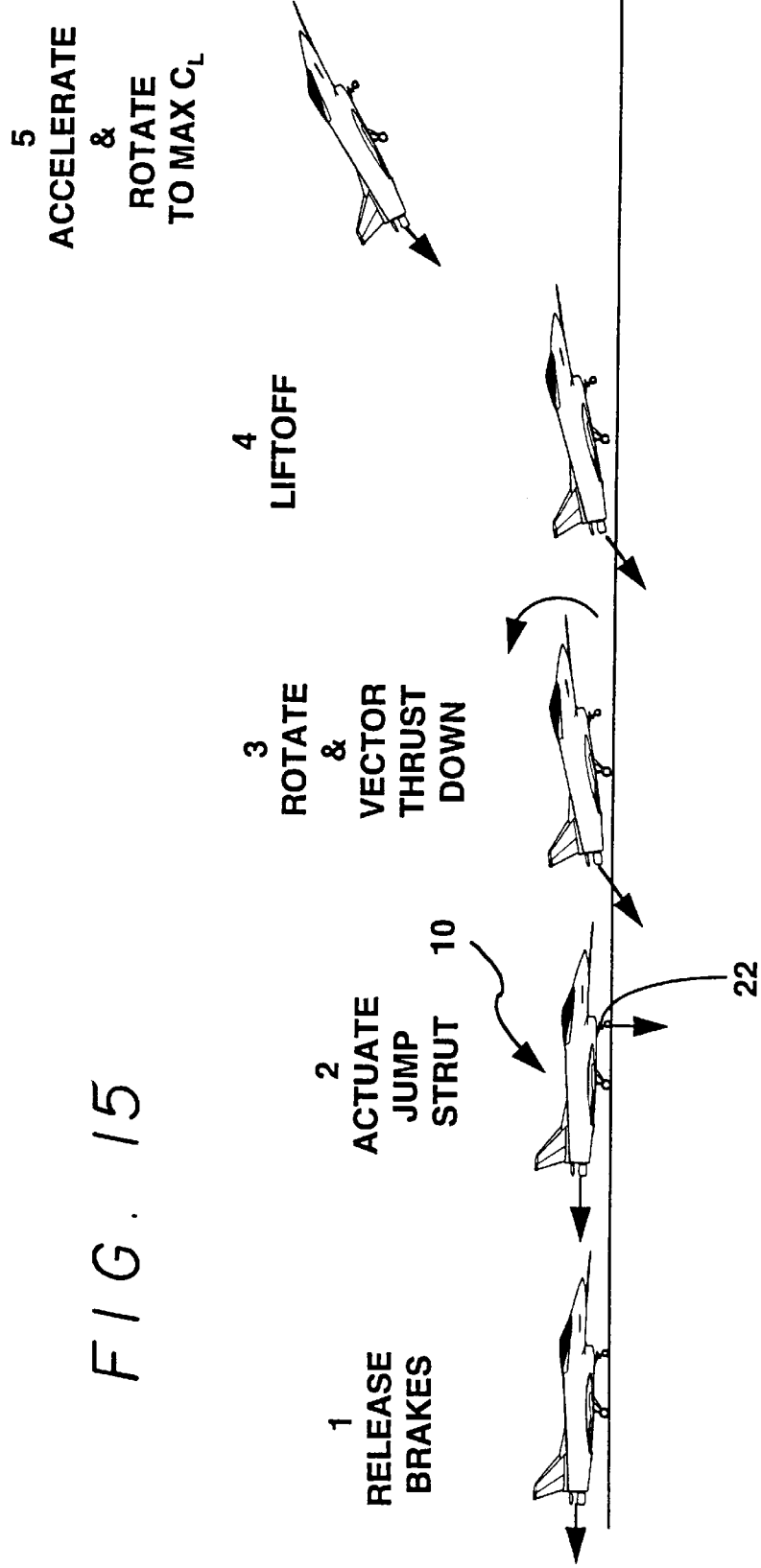
FIG. 15 illustrates a takeoff sequence of events utilizing a jump strut on the nose gear.

Referring now to FIG. 15, a takeoff is illustrated utilizing a jump strut 22 on the nose gear. In this embodiment, the ski jump ramp is not required. The advantage of this embodiment is that all the necessary systems are located on the aircraft 10. The disadvantage is that this embodiment will generally result in higher takeoff speeds and longer takeoff distances than the first mentioned embodiment. The takeoff sequence of events is summarized as follows:

In step 1 the engine is throttled up to maximum power and the brakes are released.

In step 2 the aircraft accelerates to rotation speed, which will be about 10% below the takeoff speed. The precise speed varies with the specific aircraft configuration and the weight of the payload the aircraft is carrying. When rotation speed is reached, the nose gear jump strut actuates. This causes the nose of the aircraft to pitch up, or rotate. Jump strut actuation will normally be automatically commanded by the IFPCS, but could also be manually actuated by the pilot.

In step 3, as the aircraft begins to rotate, the thrust is vectored down to generate lift. This down vectoring of thrust will also generate a pitching moment that slows the rotation of the aircraft. The aircraft continues to accelerate to takeoff speed.

In step 4 the aircraft has reached takeoff speed and the main gear lifts off the ground. The IFPCS will prevent the angle of attack from exceeding the tail scrape angle. The thrust continues to be deflected down. The thrust contribution to lift allows the aircraft to liftoff at a speed at or below stall speed.

In step 5 the aircraft has cleared the runway and its nose continues to rotate up to the maximum angle of attack. The thrust is vectored down further to stop the rotation and to generate additional lift. The aircraft continues to accelerate to its normal climb speed.

Figure 16:
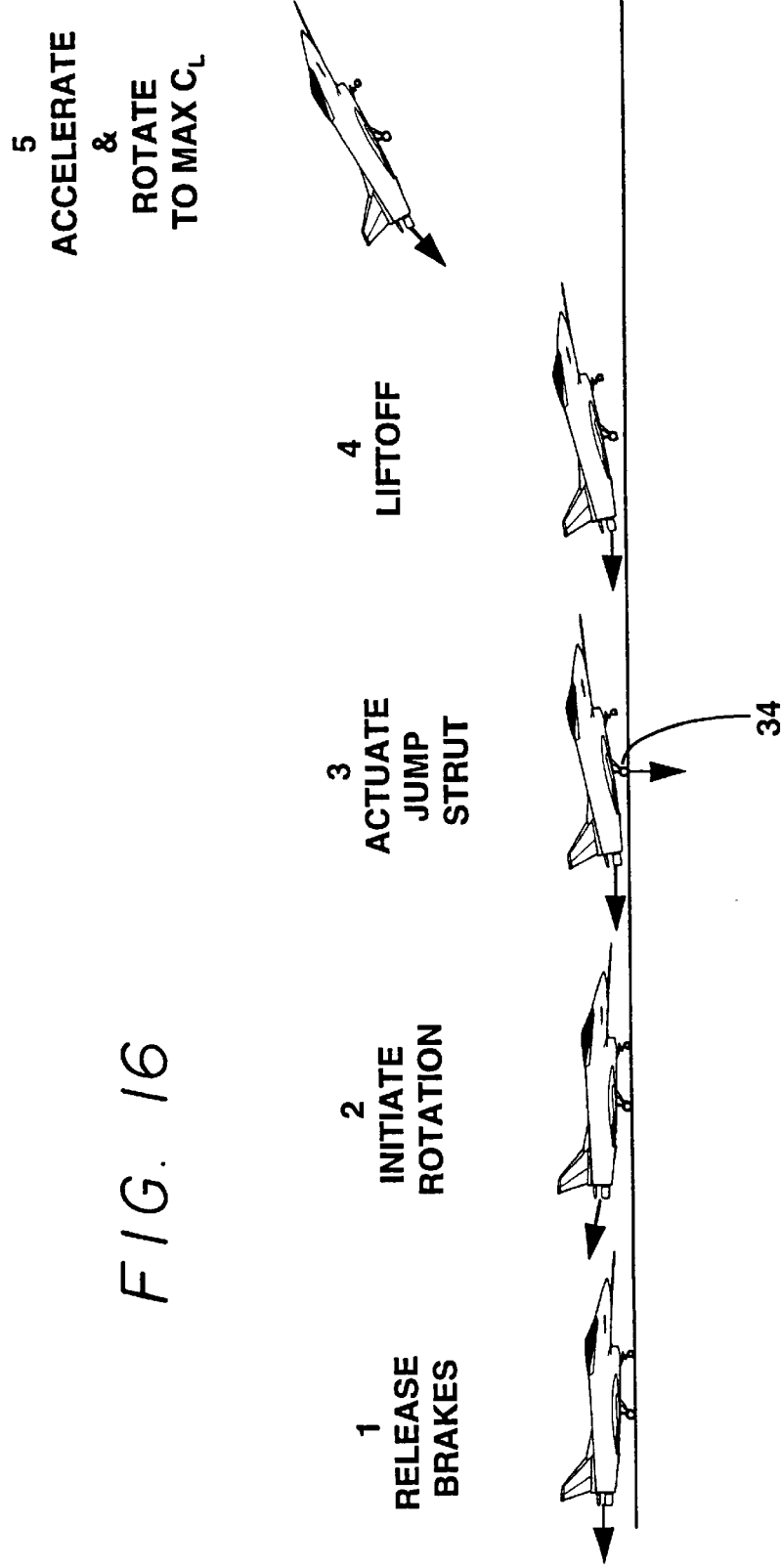
FIG. 16 illustrates a takeoff sequence of events in which the jump struts are located on each main gear.

Referring now to FIG. 16, an alternate embodiment is illustrated in which jump struts 34 are located on each main gear. As in the previous embodiment, the ski jump ramp is not required. Again, an advantage of this embodiment is that all the necessary systems are located on the aircraft 10. The disadvantages are that (1) this embodiment will generally result in higher takeoff speeds and longer takeoff distances than the first mentioned embodiment (but shorter distances than the embodiment illustrated in FIG. 15), and (2) precise timing is required for jump strut actuation. The takeoff sequence of events is summarized as follows:

In step 1 the engine is throttled up to maximum power and the brakes are released.

In step 2 the aircraft accelerates to rotation speed, which will be slightly less than the takeoff speed. The precise speed varies with the specific aircraft configuration and the weight of the payload the aircraft is carrying. When rotation speed is reached, the thrust is vectored up. This causes the nose of the aircraft to pitch up, or rotate.

In step 3, as the aircraft reaches a specified angle of attack, the IFPCS actuates the jump struts. The angle of attack for actuation is when the center of gravity of the aircraft passes exactly vertically above the main gear tire. Success using this approach depends on the IFPCS precisely knowing the location of the aircraft's center of gravity just prior to the start of the takeoff sequence.

In step 4, when the jump struts actuate in the manner of step 3, the aircraft lifts off with a vertical velocity of about ten feet per second. Further, the aircraft continues to rotate, with the rotation rate being unaffected by the jump strut actuation. As the aircraft clears the runway, the thrust is vectored down to generate additional lift and slow the rotation. The aircraft continues to accelerate.

In step 5 the aircraft has cleared the runway and its nose continues to rotate up to the maximum angle of attack. The thrust is vectored down further to stop the rotation and to generate additional lift. The aircraft continues to accelerate to its normal climb speed.

Figure 17:
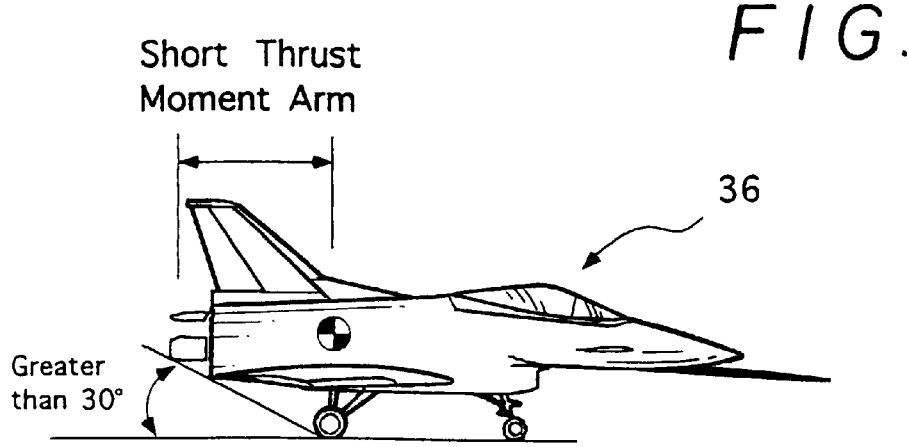
FIG. 17 is a side elevational view of another embodiment of the aircraft in which the fuselage, internal components thereof and the landing gear are arranged and constructed so as to provide a short thrust moment and a large tail scrape angle.
Figure 18:
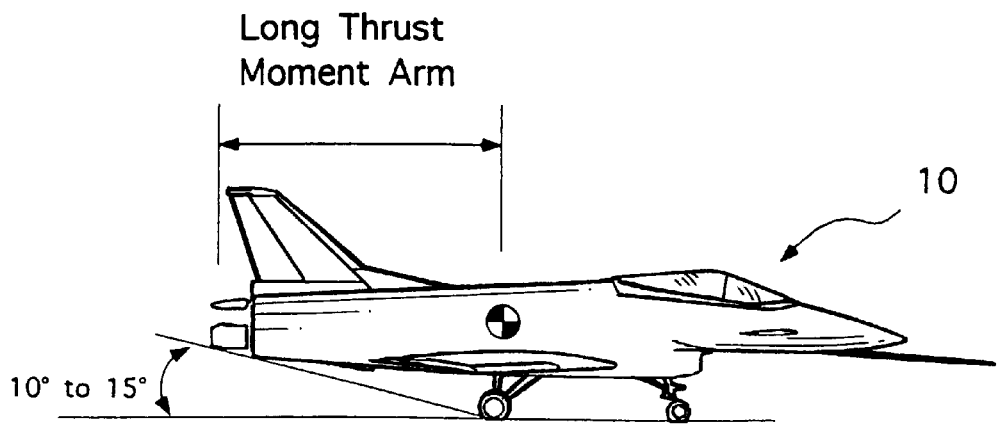
FIG. 18 is another side elevational view of the first embodiment so as to show a side-by-side comparison with the FIG. 17 embodiment.

Referring now to FIG. 17, an alternate aircraft 36 is illustrated in which the thrust moment arm is significantly reduced. The thrust moment arm is the distance between the aircraft center of gravity and the vectoring nozzle. (FIG. 18 shows the aircraft 10 of FIGS. 1–3 and 9–10, for the purposes of comparison. Aircraft 10 has a conventional relatively long thrust moment arm.) The reduced thrust moment arm allows the thrust to be vectored down more, generating additional lift, without generating a large pitching moment that must be trimmed out. This enables an aircraft configured in this manner to takeoff and land at the same speed, but at a lower angle of attack.

An aircraft configured as shown in FIG. 17 has the main landing gear located slightly behind the center of gravity. The shorter thrust moment arm results in a substantially increased tail scrape angle of 30° or greater. The increased tail scrape angle allows the aircraft to rotate to a higher angle of attack during takeoff and landing.

The combination of a significantly reduced thrust moment arm and significantly increased tail scrape angle can eliminate the need for a tail wheel, jump struts, and/or ski jump ramp. The disadvantage of this embodiment is that numerous other design constraints may prevent the thrust moment arm from being reduced or the tail scrape angle from being increased sufficiently to allow extremely short takeoffs and landings.

Figure 19:
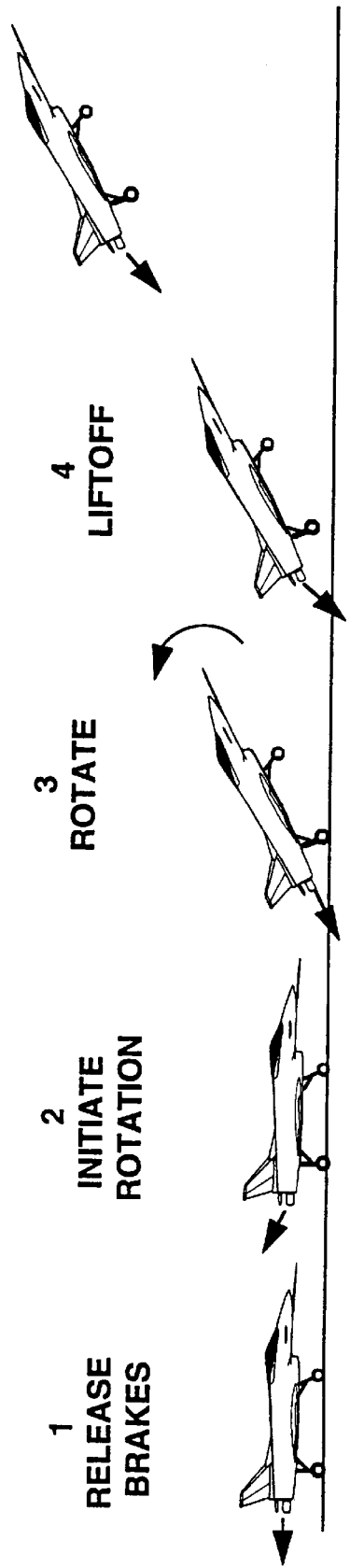
FIG. 19 illustrates the takeoff sequence of events for the aircraft shown in FIG. 17.

Referring now to FIG. 19, the sequence of events for a takeoff utilizing the aircraft embodied in FIG. 17 is summarized.

In step 1 the engine is throttled up to maximum power and the brakes are released.

In step 2 the aircraft accelerates to rotation speed. At rotation speed, the thrust is vectored up to cause the nose of the aircraft to rotate up.

In step 3 the nose has rotated up to takeoff angle of attack, which will normally be 30° or greater. The thrust is deflected down to generate lift and slow the rotation. The aircraft continues to accelerate.

In step 4 the aircraft lifts off the runway. The thrust is deflected to generate maximum lift, as well as trimming the aircraft.

In step 5 the aircraft continues to rotate up to the maximum angle of attack. The thrust is vectored down to stop the rotation and to generate additional lift. The aircraft continues to accelerate to its normal climb speed.

Referring now to FIG. 20, the sequence of events for a landing utilizing the aircraft of the FIG. 17 embodiment is summarized.

In step 1 the landing gear is extended and the aircraft is pitched up to a high angle of attack, steady-state post stall approach using the IFPCS. The aircraft is stabilized on a glide slope of about −4° at a speed between about 60 and 100 kts. At this speed, the aerodynamic control surfaces are ineffective, so stability is maintained with the thrust vectoring system. At the approach pitch attitude, the thrust is vectored down as far as possible to generate lift, while maintaining trim (no pitching moment).

In step 2, the aircraft contacts the ground with the main landing gear. The thrust is vectored from side-to-side (yaw) as needed to maintain the aircraft in a straight line down the runway. The thrust is also vectored up to slow the rotation of the aircraft.

In step 3 the aircraft has rotated down until the nose landing gear has contacted the ground. The anti-lock brakes on the main landing gear are automatically actuated through a switch that senses nose gear ground contact. If a thrust reversing system is employed (not essential for the present invention) it is actuated at this time. Aircraft steering is accomplished using the nose landing gear.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A system for enabling an aircraft to accomplish extremely sort takeoffs and landings, comprising:
    a) an integrated flight propulsion control system comprising a multi-axis thrust vectoring system and a control feedback system connected to said multi-axis thrust vectoring system and to aerodynamic control surfaces for providing enhanced stability and control authority in flight regimes associated with takeoffs and landings;
    b) a takeoff system operably engageable with said multi-axis thrust vectoring system, comprising means for initially rotating an aircraft nose and velocity vector upwardly below stall speed without substantial use of thrust vectoring from said multi-axis thrust vectoring system, said multi-axis thrust vectoring system being utilized after said initial rotation to further rotate the aircraft to a high angle of attack in a range between about 20° and 50°;
    c) a landing system operably engageable with said multi-axis thrust vectoring system, comprising means for de-rotating the aircraft from a high angle of attack in a range of between about 40° and 70° to a main gear touchdown angle of attack sufficiently low to avoid scraping the tail of the aircraft; and
    d) a high thrust-to-weight propulsion system connected to said integrated flight propulsion control system for providing sufficient lift to support the aircraft at the desired takeoff and landing speeds.

2. The system of claim 1, wherein said aerodynamic control surfaces comprise conventional aerodynamic control surfaces.

3. The system of claim 2, wherein said control feedback system simultaneously controls said multi-axis thrust vectoring system, said conventional aerodynamic control surfaces, the engine inlets, the landing gear jump struts, and any tail wheel assembly of the aircraft.

4. The system of claim 1, wherein said means for rotating an aircraft nose upwardly comprises a ski-jump ramp supported by a takeoff surface.

5. The system of claim 1, wherein said means for rotating an aircraft nose upwardly comprises a jump strut nose landing gear actuatable by said integrated flight propulsion control system.

6. The system of claim 1, wherein said means for de-rotating the aircraft comprises a tail wheel assembly attached to the rear of the aircraft's fuselage.

7. The system of claim 6, wherein said wheel device comprises a castoring wheel assembly.

8. The system of claim 6, wherein said tail wheel device comprises an actively controlled strut being controlled and modulated by said integrated flight propulsion control system.

9. An aircraft capable of achieving extremely short takeoffs and landings, comprising:
    a) a fuselage;
    b) a wing mounted to said fuselage;
    c) tricycle landing gear mounted to said wing, and
    d) a takeoff and landing system for enabling an aircraft to accomplish extremely short takeoffs and landings, comprising:
        i) an integrated flight propulsion control system comprising a multi-axis thrust vectoring system and a control feedback system connected to said multi-axis thrust vectoring system and to aerodynamic control surfaces for providing enhanced stability and control authority in flight regimes associated with takeoffs and landings;
        ii) a takeoff system operably engageable with said multi-axis thrust vectoring system, comprising means for initially rotating an aircraft nose and velocity vector upwardly below stall speed without substantial use of thrust vectoring from said multi-axis thrust vectoring system, said multi-axis thrust vectoring system being utilized after said initial rotation to further rotate the aircraft to a high angle of attack in a range between about 20° and 50°;
        iii) a landing system operably engageable with said multi-axis thrust vectoring system, comprising means for de-rotating the aircraft from a high angle of attack in a range of between about 40° and 70° to a main gear touchdown angle of attack sufficiently low to avoid scraping the tail of the aircraft; and
        iv) a high thrust-to-weight propulsion system connected to said integrated flight propulsion control system for providing sufficient lift to support the aircraft at the desired takeoff and landing speeds.

10. The aircraft of claim 9, wherein said fuselage and said landing gear are arranged as to provide a tail scrape angle between about 10° and 30°.

11. The aircraft of claim 9, wherein said fuselage, internal components thereof and said landing gear are arranged and constructed in such a manner as to provide a short thrust moment arm and a large tail scrape angle.

12. A method of flying an aircraft capable of accomplishing extremely sort takeoffs and landings, said aircraft having a tail scrape angle between about 10° and 30°, said method comprising the steps of:
    a) taking off by rotating an aircraft nose upwardly below stall speed;
    b) deflecting the aircraft thrust downward to generate lift and stop said rotation, said rotation being stopped at an angle of attack between the tail scrape angle and 70°;
    c) controlling the aircraft attitude using an integrated flight propulsion control system comprising a multi-axis thrust vectoring system and a control feedback system connected to said multi-axis thrust vectoring system and to aerodynamic control surfaces for providing enhanced stability and control authority in flight regimes associated with takeoffs and landings;

d) accelerating the aircraft to a normal flight speed;

e) pitching the aircraft to a high angle of attack attitude for approach to landing, using said integrated flight propulsion control system;

f) controlling the aircraft in the high angle of attack attitude using said integrated flight propulsion control system;

g) applying sufficient thrust to cause the aircraft to have a descent rate of 10 feet per second or less;

h) maintaining said high angle of attack attitude and descent rate until ground contact;

i) de-rotating the aircraft from said high angle of attack to a main gear touchdown angle of attack sufficiently low to avoid scraping the tail of the aircraft;

j) deflecting the thrust upward, with the aircraft's main landing gear on the ground, to slow the de-rotation rate of the aircraft to prevent damage to the nose gear.

13. The method of claim 12, further comprising the step of reversing the thrust on nose gear contact with the ground after said step of deflecting the thrust upward.

14. An aircraft capable of achieving extremely short takeoffs and landings, comprising:

a) a fuselage;

b) a wing mounted to said fuselage;

c) tricycle landing gear mounted to said fuselage, and d) a takeoff and landing system for enabling an aircraft to accomplish extremely short takeoffs and landings, comprising:

i) an integrated flight propulsion control system comprising a multi-axis thrust vectoring system and a control feedback system connected to said multi-axis thrust vectoring system and to aerodynamic control surfaces for providing enhanced stability and control authority in flight regimes associated with takeoffs and landings;

ii) a takeoff system operably engageable with said multi-axis thrust vectoring system, comprising means for initially rotating an aircraft nose and velocity vector upwardly below stall speed without substantial use of thrust vectoring from said multi-axis thrust vectoring system, said multi-axis thrust vectoring system being utilized after said initial rotation to further rotate the aircraft to a high angle of attack in a range between about 20° and 50°;

iii) a landing system operably engageable with said multi-axis thrust vectoring system, comprising means for de-rotating the aircraft from a high angle of attack in a range of between about 40° and 70° to a main gear touchdown angle of attack sufficiently low to avoid scraping the tail of the aircraft; and iv) a high thrust-to-weight propulsion system connected to said integrated flight propulsion control system for providing sufficient lift to support the aircraft at the desired takeoff and landing speeds.

15. The aircraft of claim 14, wherein said fuselage and said landing gear are arranged so as to provide a tail scrape angle between about 10° and 30°.

16. The aircraft of claim 14, wherein said fuselage, internal components thereof and said landing gear are arranged and constructed in such a manner as to provide a short thrust moment arm and a large tail scrape angle.

* * * * *